(12) United States Patent
Tang

(10) Patent No.: US 11,166,304 B2
(45) Date of Patent: Nov. 2, 2021

US011166304B2

(54) DOWNLINK CONTROL CHANNEL CONFIGURATION METHOD, NETWORK DEVICE, AND TERMINAL

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 61 days.

(21) Appl. No.: 16/593,812

(22) Filed: Oct. 4, 2019

(65) Prior Publication Data

US 2020/0037351 A1 Jan. 30, 2020

Related U.S. Application Data

(63) Continuation of application No. PCT/CN2017/080054, filed on Apr. 11, 2017.

(51) Int. Cl.
*H04W 4/00* (2018.01)
*H04W 72/12* (2009.01)
*H04W 72/04* (2009.01)

(52) U.S. Cl.
CPC ... *H04W 72/1289* (2013.01); *H04W 72/0453* (2013.01); *H04W 72/1236* (2013.01)

(58) Field of Classification Search
CPC ... H04W 72/00; H04W 72/04; H04W 72/042; H04W 72/0453; H04W 72/1236; H04W 72/1278; H04W 72/1289
See application file for complete search history.

(56) References Cited

U.S. PATENT DOCUMENTS

2007/0280166 A1* 12/2007 Jung ............... H04L 5/023
370/331
2010/0182972 A1* 7/2010 Katayama ........... H04W 72/048
370/329
(Continued)

FOREIGN PATENT DOCUMENTS

CN 102724757 A 10/2012
CN 102804672 A 11/2012
(Continued)

OTHER PUBLICATIONS

The Extended European Search Report of corresponding European application No. 17905491.1, dated Feb. 19, 2020.
(Continued)

*Primary Examiner* — Matthew W Genack
(74) *Attorney, Agent, or Firm* — Ladas & Parry, LLP

(57) ABSTRACT

The present disclosure provides a downlink control channel configuration method, a network device, and a terminal. In one aspect, according to an embodiment of the present disclosure, a frequency domain resource for transmitting a downlink control channel can be dynamically configured within each time domain resource scheduling unit and thereby the purpose of adapting to a change in different number of users is achieved by means that acquiring first indication information that is used for indicating the number of frequency domain resource scheduling units contained in a first frequency domain resource and thereby transmitting the first indication information in a downlink control channel transmitted by a pre-configured second frequency domain resource, where the first frequency domain resource is a frequency domain resource for transmitting a downlink control channel within at least one time domain resource scheduling unit.

16 Claims, 5 Drawing Sheets

(56) References Cited

U.S. PATENT DOCUMENTS

2011/0177807 A1    7/2011    Young et al.
2012/0052899 A1    3/2012    Xiaoqiu et al.

FOREIGN PATENT DOCUMENTS

| | | |
|---|---|---|
| CN | 102869049 A | 1/2013 |
| CN | 103026773 A | 4/2013 |
| CN | 103096488 A | 5/2013 |
| CN | 103828282 A | 5/2014 |
| CN | 104348572 A | 2/2015 |
| CN | 104854811 A | 8/2015 |
| CN | 105393621 A | 3/2016 |
| CN | 105917608 A | 8/2016 |
| CN | 106160978 A | 11/2016 |
| CN | 106453182 A | 2/2017 |
| CN | 108155980 A | 6/2018 |
| EP | 2343849 A2 | 7/2011 |
| WO | 2016184239 A1 | 11/2016 |
| WO | 2018187931 A1 | 10/2018 |

OTHER PUBLICATIONS

Mediatek Inc: "sPDCCH multiplexing with data", 3GPP Draft; R1-1705460 SPDCCH Multiplexing With Data1, 3rd Generation Partnership Project (3GPP), Mobile Competence Centre; 650, Route Des Lucioles; F-06921 Sophia-Antipolis Cedex; France, vol. RAN WG1, No. Spokane, USA; Apr. 3, 2017-Apr. 7, 2017 Apr. 2, 2017(Apr. 2, 2017), XP051243590.

Ericsson: "Design aspects of sPDCCH", 3GPP Draft; R1-1706075, 3rd Generation Partnership Project (3GPP), Mobile Competence Centre; 650, Route Des Lucioles: F-06921 Sophia-Antipolis Cedex; France, vol. RAN WG1, No. Spokane, US; Apr. 3, 2017-Apr. 7, 2017 Apr. 2, 2017(Apr. 2, 2017), XP051244183.

CMCC: "Discussion on downlink control monitoring resources design for sTTI", 3GPP Draft; R1-1705109, 3rd Generation Partnership Project (3GPP), Mobile Competence Centre; 650, Route Des Lucioles; F-06921 Sophia-Antipolis Cedex; France, vol. RAN WG1, No. Spokane, US; Apr. 3, 2017-Apr. 7, 2017 Apr. 2, 2017(Apr. 2, 2017), XP051243240.

The Notice of Allowance of corresponding Chinese application No. 201780089454.2, dated Oct. 20, 2020.

International Search Report in international application No. PCT/CN2017/080054, dated Dec. 29, 2017.

Nortel Networks, "Control Channel Design for the Support of Wider Bandwidth for LTE-Advanced", TSG-RAN1 R1-090157, Ljubljana, Slovenia, Jan. 2009.

The First Office Action of corresponding Chinese application No. 201780089454.2, dated Jun. 9, 2020 with search report.

The Second Office Action of corresponding Chinese application No. 201780089454.2, dated Aug. 18, 2020.

The first Office Action of corresponding Indian application No. 201917040356, dated Jan. 22, 2021.

* cited by examiner

DOWNLINK CONTROL CHANNEL CONFIGURATION METHOD, NETWORK DEVICE, AND TERMINAL

CROSS-REFERENCE TO RELATED APPLICATIONS

This application is the continuation of International Application No. PCT/CN2017/080054 filed on Apr. 11, 2017, the disclosure of which is incorporated herein by reference in its entirety.

TECHNICAL FIELD

The present disclosure relates to radio access technologies and, in particular, to a downlink control channel configuration method, a network device, and a terminal.

BACKGROUND

In a wireless communication system of Ultra Reliable and Low Latency Communication (URLLC) such as a 5G application scenario, in order to meet traffic requirements, an FDM scheme is proposed for use in downlink to multiplex a Physical Downlink Control Channel (PDCCH) with a Physical Downlink Shared Channel (PDSCH) such that the PDCCH can be transmitted in any time domain resource scheduling unit.

However, since a frequency domain resource used for transmitting a downlink control channel is fixedly configured, it is not possible to adapt to a change in different number of users; for example, when the number of users in this symbol is small, there is still capacity for a downlink control channel within the symbol so that it cannot be fully utilized, resulting in waste of spectrum resources; when the number of users in this symbol is large, it may be impossible to accommodate Downlink Control Information (DCI) of all users in a downlink control channel in the symbol, while for some users, their DCI needs to be transmitted in PDCCHs within other subsequent symbols, resulting in an increase in reading latency of the DCI so that a latency requirement from the URLLC application scenario cannot be met.

SUMMARY

In various aspects of the present disclosure, a downlink control channel configuration method, a network device, and a terminal are provided to adapt to a change in different number of users.

In an aspect of the present disclosure, a downlink control channel configuration method is provided, including:

acquiring first indication information that is used for indicating a number of frequency domain resource scheduling units contained in a first frequency domain resource, where the first frequency domain resource is a frequency domain resource for transmitting a downlink control channel within at least one time domain resource scheduling unit; and transmitting the first indication information in a downlink control channel transmitted by a pre-configured second frequency domain resource.

In a further aspect of the present disclosure, another downlink control channel configuration method is provided, including:

receiving, in a downlink control channel transmitted by a pre-configured second frequency domain resource, first indication information that is used for indicating a number of frequency domain resource scheduling units contained in a first frequency domain resource, where the first frequency domain resource is a frequency domain resource for transmitting a downlink control channel within at least one time domain resource scheduling unit; and determining, according to the first indication information, the number of frequency domain resource scheduling units contained in the first frequency domain resource.

In a further aspect of the present disclosure, a network device is provided, including:

an acquiring unit, configured to acquire first indication information that is used for indicating a number of frequency domain resource scheduling units contained in a first frequency domain resource, where the first frequency domain resource is a frequency domain resource for transmitting a downlink control channel within at least one time domain resource scheduling unit; and a transmitting unit, configured to transmit the first indication information in a downlink control channel transmitted by a pre-configured second frequency domain resource.

In a further aspect of the present disclosure, a terminal is provided, including:

a receiving unit, configured to receive, in a downlink control channel transmitted by a pre-configured second frequency domain resource, first indication information that is used for indicating a number of frequency domain resource scheduling units contained in a first frequency domain resource, where the first frequency domain resource is a frequency domain resource for transmitting a downlink control channel within at least one time domain resource scheduling unit; and a determining unit, configured to determine, according to the first indication information, the number of frequency domain resource scheduling units contained in the first frequency domain resource.

It can be seen from the above technical solutions that, on one hand, according to an embodiment of the present disclosure, a frequency domain resource for transmitting a downlink control channel can be dynamically configured within each time domain resource scheduling unit and thereby the purpose of adapting to a change in different number of users is achieved by means that acquiring first indication information that is used for indicating the number of frequency domain resource scheduling units contained in a first frequency domain resource and transmitting the first indication information in a downlink control channel transmitted by a pre-configured second frequency domain resource, where the first frequency domain resource is a frequency domain resource for transmitting a downlink control channel within at least one time domain resource scheduling unit.

It can be seen from the above technical solutions that, on the other hand, according to an embodiment of the present disclosure, a frequency domain resource for transmitting a downlink control channel can be dynamically configured within each time domain resource scheduling unit and thereby the purpose of adapting to a change in different number of users is achieved by means that receiving, in a downlink control channel transmitted by a pre-configured second frequency domain resource, first indication information that is used for indicating the number of frequency domain resource scheduling units contained in a first frequency domain resource and further determining, according to the first indication information, the number of frequency domain resource scheduling units contained in the first frequency domain resource, where the first frequency domain resource is a frequency domain resource for transmitting a downlink control channel within at least one time domain resource scheduling unit.

In addition, with the technical solutions provided by the present disclosure, since a mode in which a downlink control channel and a downlink data channel fully share a frequency domain resource is used, utilization of a spectrum resource can be further improved while a latency requirement from the URLLC application scenario is ensured.

In addition, compared to indication of a frequency domain resource for transmitting a downlink control channel with a bitmap mode, according to the technical solutions provided by the present disclosure, signaling overhead can be effectively saved, meanwhile complexity of a terminal can also be reduced and a speed at which the terminal detects a downlink data channel is expedited, and it is ensured that the downlink control channel of each terminal is transmitted instantly, thereby effectively shortening the latency of the URLLC application scenario.

BRIEF DESCRIPTION OF DRAWING(S)

In order to describe the technical solutions in embodiments of the present disclosure more clearly, accompanying drawings used in the description of embodiments or the prior art will be briefly described hereunder. Obviously, the described drawings are merely some embodiments of present disclosure. For persons of ordinary skill in the art, other drawings may be obtained based on these drawings without paying any creative effort.

DESCRIPTION OF EMBODIMENTS

Figure 1A:
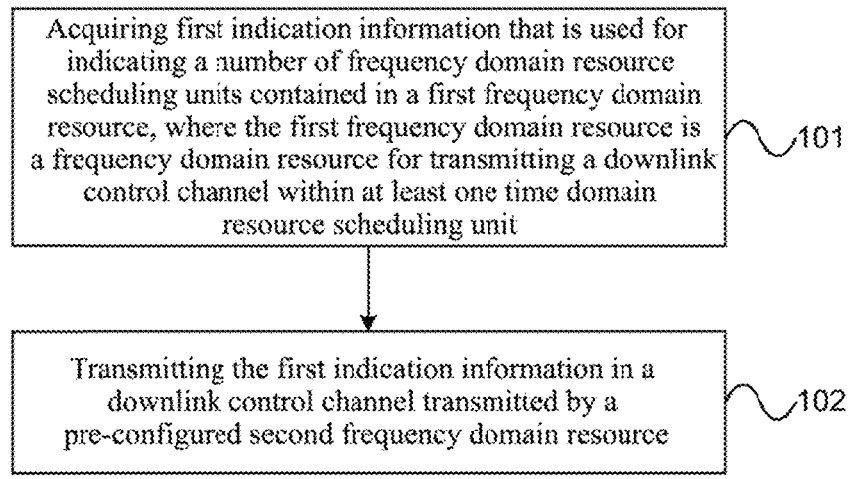
FIG. 1A is a schematic flowchart of a downlink control channel configuration method provided by an embodiment of the present disclosure.

In order to make objectives, technical solutions, and advantages of embodiments of the present disclosure clearer, the technical solutions in the embodiments of the present disclosure will be described hereunder clearly and comprehensively with reference to the accompanying drawings in the embodiments of the present disclosure. Obviously, the described embodiments are only a part of embodiments of the present disclosure, rather than all embodiments of the present disclosure. All other embodiments obtained by persons of ordinary skill in the art based on the embodiments of the present disclosure without paying any creative effort shall fall into the scope protected by the present disclosure.

In a wireless communication system such as a 5G system, a downlink multiple access scheme generally uses an Orthogonal Frequency Division Multiple Access (OFDMA) mode. A downlink resource of the system is divided into Orthogonal Frequency Division Multiple (OFDM) symbols in terms of time and is divided into subcarriers in terms of frequency.

A normal downlink subframe contains two slots, each slot has 7 or 6 OFDM symbols, and a normal downlink subframe has a total of 14 OFDM symbols or 12 OFDM symbols. The LTE Release 8/9/10 standard also defines a size of a Resource Block (RB), where one resource block contains 12 subcarriers in the frequency domain and a duration of a half subframe (i.e. one time slot) in the time domain, that is, containing 7 or 6 OFDM symbols. An RE (Resource Element) or resource granule is the minimum unit of resources in a physical resource.

Various of data carried on a subframe are grouped and mapped by dividing various physical channels on a physical time-frequency resource of the subframe. The various physical channels can be roughly divided into two categories: a control channel and a traffic channel. Correspondingly, the data carried in the control channel may be referred to as control data (which generally may be referred to as control information), and the data carried in the traffic channel may be referred to as traffic data (which generally may be referred to as data). A fundamental purpose of transmitting a subframe is to transmit traffic data, and the control channel functions to assist in transmission of the traffic data.

In transmitting the control data, a Resource Element (RE) is the minimum transmission unit, but one RE is too small. Therefore, in most cases, a Resource Element Group (REG) or a Control Channel Element (CCE) is used as the transmission unit. A complete Physical Downlink Control Channel (PDCCH) may be mapped to one or several Control Channel Elements (CCE). A PDCCH may be mapped to 1, 2, 4 or 8 CCEs, that is, composed of 1, 2, 4 or 8 CCEs, respectively corresponding to an aggregation level of 1, 2, 4, or 8.

Due to introduction of a URLLC wireless communication system such as a 5G application scenario, in order to meet traffic requirements, an FDM scheme is proposed for use in downlink to multiplex a PDCCH with a PDSCH such that the PDCCH can be transmitted in any time domain resource scheduling unit.

In addition, the term such as "and/or" herein is merely an association describing associated objects, which indicates that there may be three relationships, for example, A and/or B may indicate presence of A only, of both A and B, and of B only. Moreover, the character "/" herein generally indicates that contextual objects have an "or" relationship.

FIG. 1A is a schematic flowchart of a downlink control channel configuration method provided by an embodiment of the present disclosure, as shown by FIG. 1A.

101: Acquiring first indication information that is used for indicating a number of frequency domain resource scheduling units contained in a first frequency domain resource, where the first frequency domain resource is a frequency domain resource for transmitting a downlink control channel within at least one time domain resource scheduling unit.

102: Transmitting the first indication information in a downlink control channel transmitted by a pre-configured second frequency domain resource.

It should be noted that an executive entity of 101~102 may be a network device.

The downlink control channel may be specifically a Physical Downlink Control Channel (PDCCH).

In a possible implementation of this embodiment, the frequency domain resource scheduling unit may include but is not limited to an RB, an REG, a Resource Block Group (RBG), or a CCE, which is not particularly limited in this embodiment.

Specifically, distribution mode of the frequency domain resource scheduling unit may include, but is not limited to a continuous distribution mode or a discontinuous distribution mode, which is not particularly limited in this embodiment.

In a possible implementation of this embodiment, it is also possible to further transmit fifth indication information through high layer signaling or a system broadcast message, where the fifth indication information is used to indicate at least one of a location, a size, and a sequence of the frequency domain resource scheduling unit to determine which frequency domain resource scheduling units are contained in the first frequency domain resource.

In particular, the network device may specifically transmit fifth indication information to a terminal through high layer signaling or a system broadcast message.

For example, the high layer signaling may be a Radio Resource Control (RRC) message and, specifically, the fifth indication information may be carried via an Information Element (IE) in the RRC message, where the RRC message may be an RRC message in the prior art, such as an RRC CONNECTION RECONFIGURATION message or the like, which is not limited in this embodiment. The fifth indication information is carried by extending the IE of the existing RRC message, alternatively, the RRC message may also be different from the existing RRC message in the prior art.

For another example, the high layer signaling may be a Media Access Control (MAC) Control Element (CE) message and, specifically, the fifth indication information may be carried by adding a new MAC CE message.

For another example, specifically, the fifth indication information may be carried by using a vacant bit in an existing Master Information Block (MIB) or a System Information Block (SIB) of the system broadcast message, alternatively, the fifth indication information may be carried by adding a new SIB.

It will be appreciated that the high layer signaling or the system broadcast message involved in the following embodiments may be comprehended using the above way.

Further, in an embodiment, the network device may further transmit the fifth indication information to the terminal without using the high layer signaling or the system broadcast message, but preconfigure at least one of a location, a size, and a sequence of the frequency domain resource scheduling unit. In this way, the terminal may obtain the at least one of the location, the size, and the sequence of the frequency domain resource scheduling unit according to the pre-configuration, such as a protocol reservation.

For example, the fifth indication information is used to indicate the location of the frequency domain resource scheduling unit, then the size and the sequence of the frequency domain resource scheduling unit may be predefined in the protocol. In this way, it can be determined, according to the fifth indication information and the protocol definition, which frequency domain resource scheduling units are contained in the first frequency domain resource.

Alternatively, for another example, the fifth indication information is used to indicate the location and the size of the frequency domain resource scheduling unit, then the sequence of the frequency domain resource scheduling unit may be predefined in the protocol. In this way, it can be determined, according to the fifth indication information and the protocol definition, which frequency domain resource scheduling units are contained in the first frequency domain resource.

Alternatively, for another example, the fifth indication information is used to indicate the location and the sequence of the frequency domain resource scheduling unit, then the size of the frequency domain resource scheduling unit may be predefined in the protocol. In this way, it can be determined, according to the fifth indication information and the protocol definition, which frequency domain resource scheduling units are contained in the first frequency domain resource.

Alternatively, for another example, the fifth indication information is used to indicate the size and the sequence of the frequency domain resource scheduling unit, then the location of the frequency domain resource scheduling unit may be predefined in the protocol. In this way, it can be determined, according to the fifth indication information and the protocol definition, which frequency domain resource scheduling units are contained in the first frequency domain resource.

Alternatively, for another example, the fifth indication information is used to indicate the location, the size, and the sequence of the frequency domain resource scheduling unit. In this way, it can be determined, according to the fifth indication information, which frequency domain resource scheduling units are contained in the first frequency domain resource.

In a possible implementation of this embodiment, the time domain resource scheduling unit may include, but is not limited to a symbol or a mini-slot, which is not particularly limited in this embodiment. In this way, a latency requirement from the URLLC application scenario can be met.

In a possible implementation of this embodiment, before 102, it is also possible to further transmit second indication information through high layer signaling or a system broadcast message, where the second indication information is used to indicate at least one of a location and a size of the second frequency domain resource.

It will be appreciated that the location and the size of the second frequency domain resource refer to a location and a size of a frequency domain resource scheduling unit contained in the second frequency domain resource to determine which frequency domain resource scheduling units are contained in the second frequency domain resource.

In particular, the network device may specifically transmit second indication information to the terminal through high layer signaling or a system broadcast message.

Further, in an embodiment, the network device may further transmit the second indication information to the terminal without using the high layer signaling or the system broadcast message, but preconfigure at least one of a location and a size of the second frequency domain resource. In this way, the terminal may obtain the at least one of the location and the size of the second frequency domain resource according to the pre-configuration, such as a protocol reservation.

For example, the second indication information is used to indicate the location of the second frequency domain resource, then the size of the second frequency domain resource may be predefined in the protocol. In this way, it can be determined, according to the second indication information and the protocol definition, which frequency domain resource scheduling units are contained in the second frequency domain resource.

Alternatively, for another example, the second indication information is used to indicate the size of the second frequency domain resource, then the location of the second frequency domain resource may be predefined in the protocol. In this way, it can be determined, according to the second indication information and the protocol definition, which frequency domain resource scheduling units are contained in the second frequency domain resource.

Alternatively, for another example, the second indication information is used to indicate the location and the size of the second frequency domain resource. In this way, it can be determined, according to the second indication information, which frequency domain resource scheduling units are contained in the second frequency domain resource.

In this way, at least one of a location and a size of the first frequency domain resource may be then determined according to the first indication information, at least one of a location, a size and a sequence of a frequency domain resource scheduling unit contained in the first frequency domain resource, and the at least one of the location and the size of the second frequency domain resource.

Alternatively, at least one of a location and a size of the first frequency domain resource may be further determined according to the first indication information, at least one of a location, a size and a sequence of a frequency domain resource scheduling unit contained in the first frequency domain resource, and at least one of a location and a size of a pre-configured reference frequency domain resource.

In particular, the network device may specifically transmit sixth indication information to the terminal through high layer signaling or a system broadcast message, where the sixth indication information is used to indicate the at least one of the location and the size of the reference frequency domain resource to determine which frequency domain resource scheduling units are contained in the reference frequency domain resource.

It will be appreciated that the location and the size of the reference frequency domain resource refer to a location and a size of a frequency domain resource scheduling unit contained in the reference frequency domain resource.

Further, in an embodiment, the network device may further transmit the sixth indication information to the terminal without using the high layer signaling or the system broadcast message, but preconfigure at least one of a location and a size of the reference frequency domain resource. In this way, the terminal may then obtain the at least one of the location and the size of the reference frequency domain resource according to the pre-configuration, such as a protocol reservation.

For example, the sixth indication information is used to indicate the location of the reference frequency domain resource, then the size of the reference frequency domain resource may be predefined in the protocol. In this way, it can be determined, according to the sixth indication information and the protocol definition, which frequency domain resource scheduling units are contained in the reference frequency domain resource.

Alternatively, for another example, the sixth indication information is used to indicate the size of the reference frequency domain resource, then the location of the reference frequency domain resource may be predefined in the protocol. In this way, it can be determined, according to the sixth indication information and the protocol definition, which frequency domain resource scheduling units are contained in the reference frequency domain resource.

Alternatively, for another example, the sixth indication information is used to indicate the location and the size of the reference frequency domain resource. In this way, it can be determined, according to the sixth indication information, which frequency domain resource scheduling units are contained in the reference frequency domain resource.

In a possible implementation of this embodiment, it is also possible to further transmit third indication information that is used for indicating a third frequency domain resource in a downlink control channel transmitted by the first frequency domain resource or the second frequency domain resource, where the third frequency domain resource contains the first frequency domain resource and the frequency domain resource for transmitting the downlink data channel within the at least one time domain resource scheduling unit.

In this way, the terminal may then obtain, according to the third frequency domain resource and the first frequency domain resource, the frequency domain resource for transmitting the downlink data channel within the at least one time domain resource scheduling unit. For example, a difference between the third frequency domain resource and the first frequency domain resource is used as the frequency domain resource for transmitting the downlink data channel within the at least one time domain resource scheduling unit.

The downlink data channel may be specifically a Physical Downlink Shared Channel (PDSCH).

It will be appreciated that a location and a size of the third frequency domain resource refer to a location and a size of a frequency domain resource scheduling unit contained in the third frequency domain resource to determine which frequency domain resource scheduling units are contained in the third frequency domain resource.

In a possible implementation of this embodiment, it is also possible to further transmit fourth indication information through high layer signaling or a system broadcast message, where the fourth indication information is used to indicate at least one of a location and a size of the fourth frequency domain resource.

The fourth frequency domain resource is a default value of the first frequency domain resource. When the terminal has not received the first indication information transmitted by the network device, it determines the fourth frequency domain resource as the first frequency domain resource; when the terminal receives the first indication information transmitted by the network device, it determines the first frequency domain resource according to the first indication information.

It will be appreciated that a location and a size of the fourth frequency domain resource refer to a location and a size of a frequency domain resource scheduling unit contained in the fourth frequency domain resource.

In particular, the network device may specifically transmit fourth indication information to the terminal through high layer signaling or a system broadcast message.

Further, in an embodiment, the network device may further transmit the fourth indication information to the terminal without using the high layer signaling or the system broadcast message, but preconfigure at least one of a location and a size of the fourth frequency domain resource. In this way, the terminal may obtain the at least one of the location and the size of the fourth frequency domain resource according to the pre-configuration, such as a protocol reservation.

In order to describe the method provided by the embodiment of the present disclosure more clearly, the following will respectively take a continuous distribution mode and a discontinuous distribution mode for the frequency domain resource scheduling unit contained in the first frequency domain resource as an example. In each time domain resource scheduling unit, the frequency domain resource scheduling unit contained in the first frequency domain resource for transmitting the PDCCH may be referred to as a candidate frequency domain resource scheduling unit.

Figure 1B:
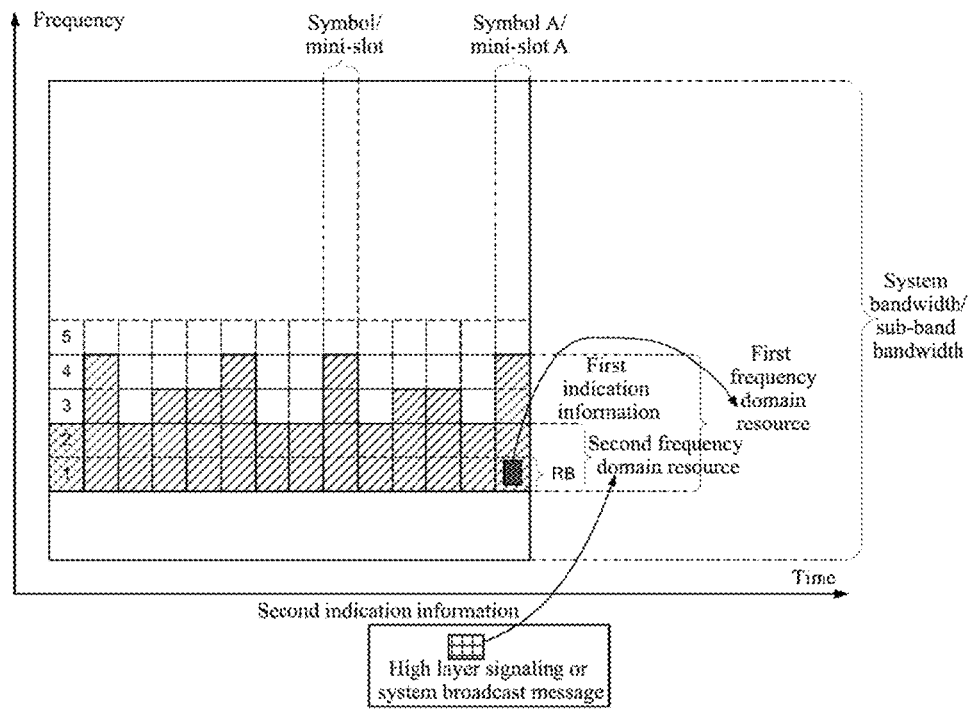
FIG. 1B is a schematic diagram showing distribution of a first frequency domain resource provided by the embodiment corresponding to FIG. 1A.

FIG. 1B is a schematic diagram showing distribution of a first frequency domain resource provided by the embodiment corresponding to FIG. 1A. As shown by FIG. 1B, the candidate frequency domain resource scheduling unit is an RB of continuous distribution, that is, a candidate RB1, a candidate RB2, a candidate RB3, a candidate RB4, and a candidate RB5. A second frequency domain resource is semi-statically indicated by second indication information contained in high layer signaling or a system broadcast message as the candidate RB1 and the candidate RB2. In the downlink control channel transmitted by the second frequency domain resource, the first indication information transmitted by the network device to the terminal indicates that the number of frequency domain resource scheduling units contained in the first frequency domain resource in one time domain resource scheduling unit such as the symbol A or mini-slot A is 4, that is, the number of candidate frequency domain resource scheduling units is 4; and fifth indication information contained in high layer signaling or a system broadcast message semi-statically indicates at least one of a location, a size, and a sequence of a candidate frequency domain resource scheduling unit. In this way, the terminal may then obtain the number of candidate frequency domain resource scheduling units according to the first indication information, and further determine, in combination with the fifth indication information and the second frequency domain resource, which candidate frequency domain resource scheduling units are contained in the first frequency domain resource within the symbol A or mini-slot A, as shown by the RB in the diagonally shaded portion of FIG. 1B, that is, the candidate RB1, the candidate RB2, the candidate RB3, and the candidate RB4.

Figure 1C:
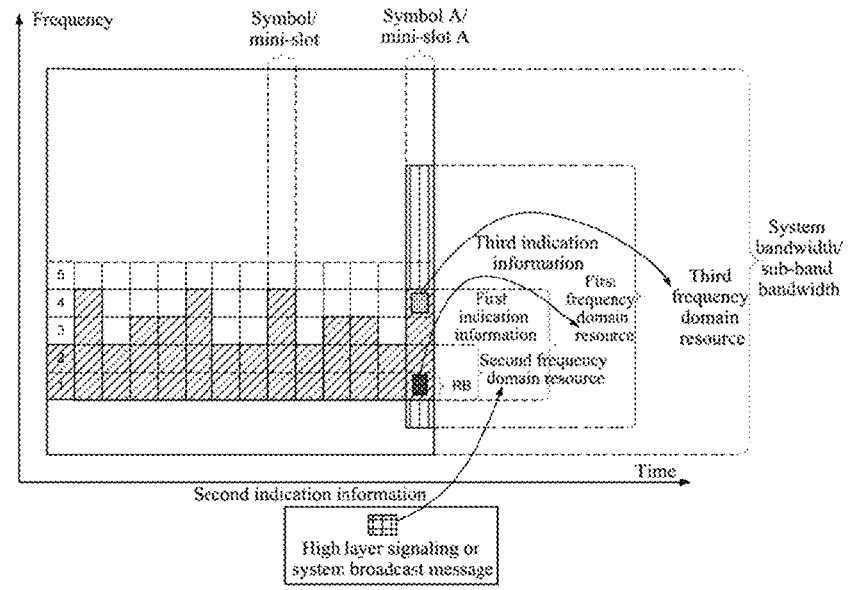
FIG. 1C is a schematic diagram showing distribution of another first frequency domain resource provided by the embodiment corresponding to FIG. 1A.

FIG. 1C is a schematic diagram showing distribution of another first frequency domain resource provided by the embodiment corresponding to FIG. 1A. As shown by FIG. 1C, compared to FIG. 1B, after the first frequency domain resource is determined, the network device may also further transmit third indication information that is used for indicating a third frequency domain resource within the symbol A or mini-slot A to the terminal in the downlink control channel transmitted by the first frequency domain resource. In this way, the terminal may then obtain the third frequency domain resource according to the third indication information, and further subtract the first frequency domain resource from the third frequency domain resource to determine a frequency domain resource used by the terminal to transmit the PDSCH within the symbol A or mini-slot A, as shown by the RB in the vertically shaded portion of FIG. 1C.

Figure 1D:
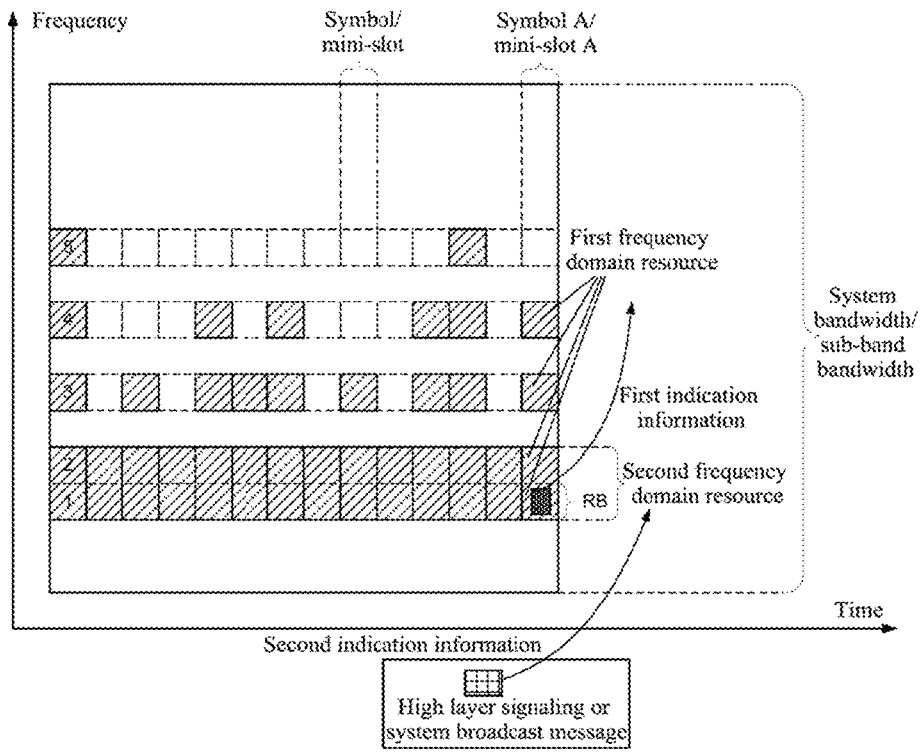
FIG. 1D is a schematic diagram showing distribution of another first frequency domain resource provided by the embodiment corresponding to FIG. 1A.

FIG. 1D is a schematic diagram showing distribution of another first frequency domain resource provided by the embodiment corresponding to FIG. 1A. As shown by FIG. 1D, the candidate frequency domain resource scheduling unit is an RB of discontinuous distribution, that is, a candidate RB1, a candidate RB2, a candidate RB3, a candidate RB4, and a candidate RB5. A second frequency domain resource is semi-statically indicated by second indication information contained in high layer signaling or a system broadcast message as the candidate RB1 and the candidate RB2. In the downlink control channel transmitted by the second frequency domain resource, the first indication information transmitted by the network device to the terminal indicates that the number of frequency domain resource scheduling units contained in the first frequency domain resource within one time domain resource scheduling unit such as the symbol A or mini-slot A is 4, that is, the number of candidate frequency domain resource scheduling units is 4; and fifth indication information contained in high layer signaling or a system broadcast message semi-statically indicates at least one of a location, a size, and a sequence of a candidate frequency domain resource scheduling unit. In this way, the terminal may then obtain the number of candidate frequency domain resource scheduling units according to the first indication information, and further determine, in combination with the fifth indication information and the second frequency domain resource, which candidate frequency domain resource scheduling units are contained in the first frequency domain resource within the symbol A or mini-slot A, as shown by the RB in the diagonally shaded portion of FIG. 1D, that is, the candidate RB1, the candidate RB2, the candidate RB3, and the candidate RB4.

Figure 1E:
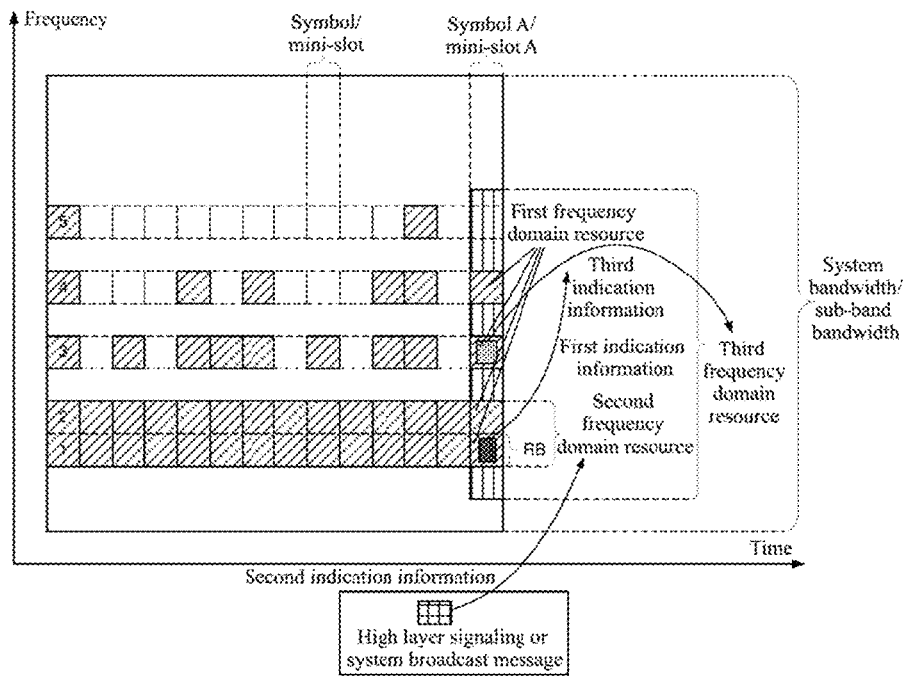
FIG. 1E is a schematic diagram showing distribution of another first frequency domain resource provided by the embodiment corresponding to FIG. 1A.

FIG. 1E is a schematic diagram showing distribution of another first frequency domain resource provided by the embodiment corresponding to FIG. 1A. As shown by FIG. 1E, compared to FIG. 1D, after the first frequency domain resource is determined, the network device may also further transmit third indication information that is used for indicating a third frequency domain resource within the symbol A or mini-slot A to the terminal in the downlink control channel transmitted by the first frequency domain resource. In this way, the terminal may then obtain the third frequency domain resource according to the third indication information, and further subtract the first frequency domain resource from the third frequency domain resource to determine a frequency domain resource used by the terminal to transmit a PDSCH within the symbol A or mini-slot A, as shown by the RB in the vertically shaded portion of FIG. 1E.

Figure 1F:
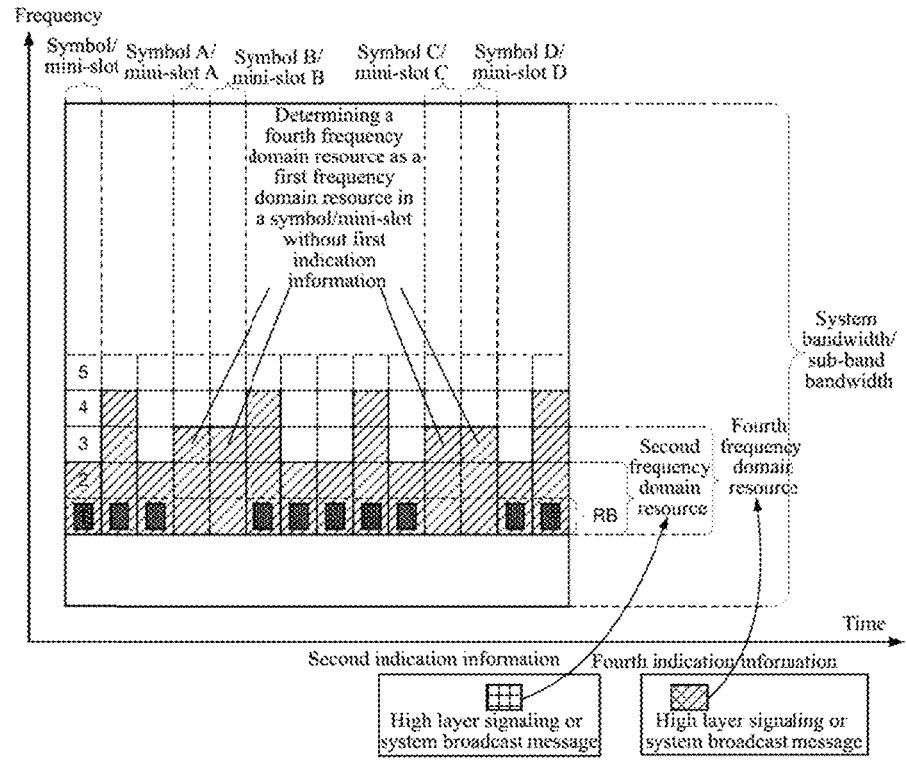
FIG. 1F is a schematic diagram showing distribution of another first frequency domain resource provided by the embodiment corresponding to FIG. 1A.

FIG. 1F is a schematic diagram showing distribution of another first frequency domain resource provided by the embodiment corresponding to FIG. 1A. As shown by FIG. 1F, if the terminal has not received the first indication information transmitted by the network device in a certain time domain resource scheduling unit such as the symbol A/mini-slot A, symbol B/mini-slot B, symbol C/mini-slot C, and symbol D/mini-slot D, it determines the first frequency domain resource according to a default fourth frequency domain resource. As a default value of the first frequency domain resource, the fourth frequency domain resource may be defined by a pre-configuration such as a protocol reservation or may be indicated by fourth indication information carried in high layer signaling or a system broadcast message that is transmitted by the network device to the terminal, which is not particularly limited by this embodiment.

Figure 1G:
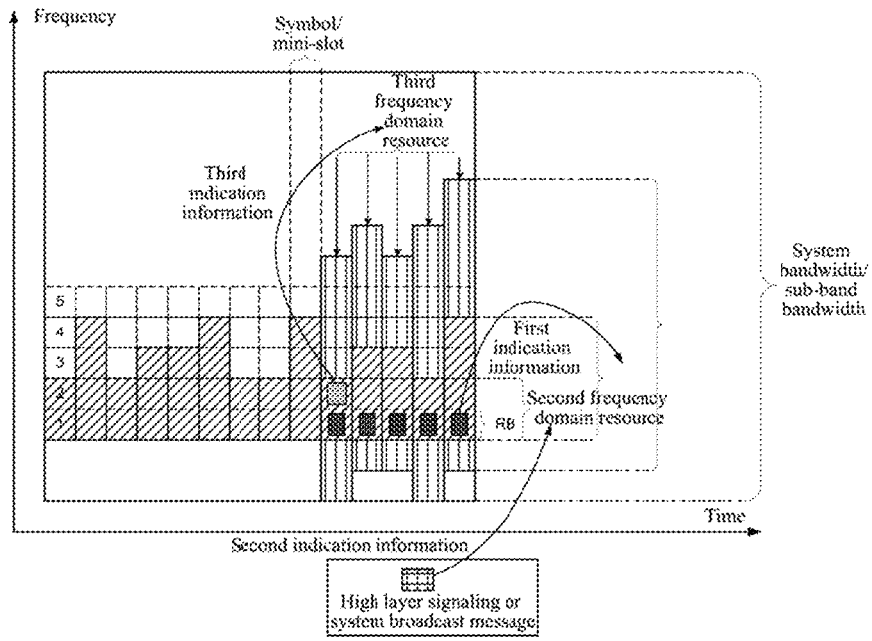
FIG. 1G is a schematic diagram showing distribution of another first frequency domain resource provided by the embodiment corresponding to FIG. 1A.

FIG. 1G is a schematic diagram showing distribution of another first frequency domain resource provided by the embodiment corresponding to FIG. 1A. As shown by FIG. 1G, the candidate frequency domain resource scheduling unit is an RB of continuous distribution, that is, a candidate RB1, a candidate RB2, a candidate RB3, a candidate RB4, and a candidate RB5. A second frequency domain resource is semi-statically indicated by second indication information contained in high layer signaling or a system broadcast message as the candidate RB1 and the candidate RB2. In the downlink control channel transmitted by the second frequency domain resource, the first indication information transmitted by the network device to the terminal in each time domain resource scheduling unit such as a symbol or a mini-slot indicates the number of frequency domain resource scheduling units contained in the first frequency domain resource within the symbol or the mini-slot, that is, the number of candidate frequency domain resource scheduling units; and fifth indication information contained in high layer signaling or a system broadcast message semi-statically indicates at least one of a location, a size and a sequence of a candidate frequency domain resource scheduling unit. In this way, the terminal may then obtain the number of candidate frequency domain resource scheduling units according to the first indication information, and further determine, in combination with the fifth indication information and the second frequency domain resource, which candidate frequency domain resource scheduling units are contained in the first frequency domain resource within each symbol or mini-slot, as shown by the RB in the diagonally shaded portion of FIG. 1G. After the first frequency domain resource is determined, the network device may also further transmit third indication information to the terminal in the downlink control channel transmitted by the first frequency domain resource in order to indicate third frequency domain resources within multiple symbols or mini-slots at a time, for example, to perform repeated transmissions of traffic in the URLLC application scenario, or the like. In this way, the terminal may then obtain the third frequency domain resources within multiple symbols or mini-slots according to the third indication information, and further subtract the first frequency domain resource from the third frequency domain resources to determine a frequency domain resource used by the terminal to transmit a PDSCH within each symbol or mini-slot, as shown by the RB in the vertically shaded portion of FIG. 1G.

Figure 1H:
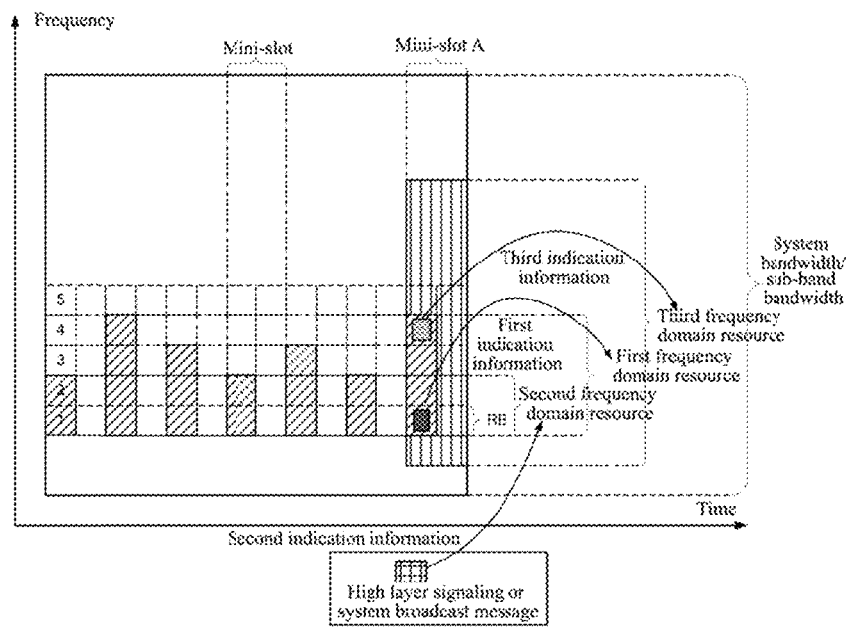
FIG. 1H is a schematic diagram showing distribution of another first frequency domain resource provided by the embodiment corresponding to FIG. 1A.

FIG. 1H is a schematic diagram showing distribution of another first frequency domain resource provided by the embodiment corresponding to FIG. 1A. As shown by FIG. 1H, the first frequency domain resource for transmitting the downlink control channel within each time domain resource scheduling unit occupies only half of each time domain resource scheduling unit, for example, occupies only one symbol.

In this embodiment, a frequency domain resource for transmitting a downlink control channel can be dynamically configured within each time domain resource scheduling unit and thereby the purpose of adapting to a change in different number of users is achieved by means that acquiring first indication information that is used for indicating the number of frequency domain resource scheduling units contained in a first frequency domain resource and transmitting the first indication information in a downlink control channel transmitted by a pre-configured second frequency domain resource, where the first frequency domain resource is a frequency domain resource for transmitting a downlink control channel within at least one time domain resource scheduling unit.

In addition, with the technical solutions provided by the present disclosure, since a mode in which a downlink control channel and a downlink data channel fully share a frequency domain resource is used, utilization of a spectrum resource can be further improved while a latency requirement from the URLLC application scenario is ensured.

In addition, compared to indication of a frequency domain resource for transmitting a downlink control channel with a bitmap mode, according to the technical solutions provided by the present disclosure, signaling overhead can be effectively saved, meanwhile complexity of a terminal can also be reduced and a speed at which the terminal detects a downlink data channel is expedited, and it is ensured that the downlink control channel of each terminal is transmitted instantly, thereby effectively shortening the latency of the URLLC application scenario.

Figure 2:
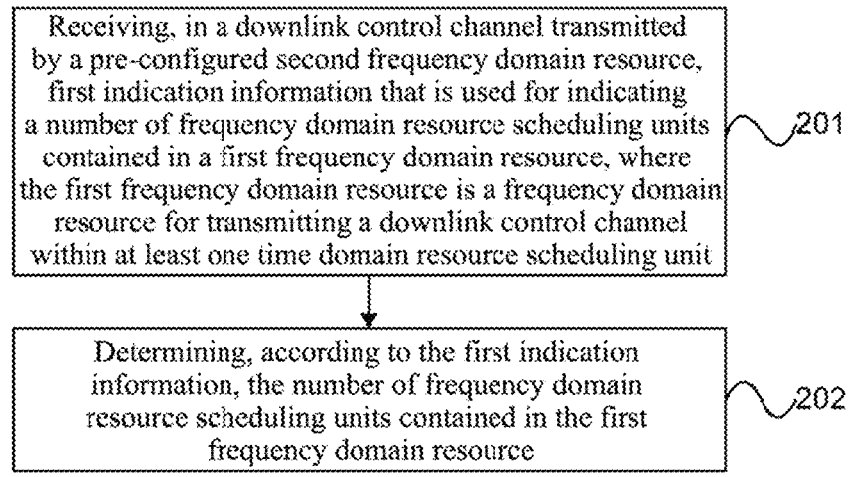
FIG. 2 is a schematic flowchart of another downlink control channel configuration method provided by another embodiment of the present disclosure.

FIG. 2 is a schematic flowchart of another downlink control channel configuration method provided by another embodiment of the present disclosure, as shown by FIG. 2.

201: receiving, in a downlink control channel transmitted by a pre-configured second frequency domain resource, first indication information that is used for indicating a number of frequency domain resource scheduling units contained in a first frequency domain resource, where the first frequency domain resource is a frequency domain resource for transmitting a downlink control channel within at least one time domain resource scheduling unit.

202: determining, according to the first indication information, the number of frequency domain resource scheduling units contained in the first frequency domain resource.

It should be noted that an executive entity of 201~202 may be a terminal.

The downlink control channel may be specifically a Physical Downlink Control Channel (PDCCH).

In a possible implementation of this embodiment, the frequency domain resource scheduling unit may include but is not limited to an RB, an REG, a Resource Block Group (RBG), or a CCE, which is not particularly limited in this embodiment.

Specifically, distribution mode of the frequency domain resource scheduling unit may include, but is not limited to a continuous distribution mode or a discontinuous distribution mode, which is not particularly limited in this embodiment.

In a possible implementation of this embodiment, it is also possible to further receive fifth indication information through high layer signaling or a system broadcast message, where the fifth indication information is used to indicate at least one of a location, a size, and a sequence of the frequency domain resource scheduling unit to determine which frequency domain resource scheduling units are contained in the first frequency domain resource.

In particular, the terminal may specifically receive fifth indication information transmitted by a network device through high layer signaling or a system broadcast message.

For example, the high layer signaling may be a Radio Resource Control (RRC) message and, specifically, the fifth indication information may be carried via an Information Element (IE) in the RRC message, where the RRC message may be an RRC message in the prior art, such as an RRC CONNECTION RECONFIGURATION message, or the like, which is not limited in this embodiment. The fifth indication information is carried by extending the IE of the existing RRC message, alternatively, the RRC message may also be different from the existing RRC message in the prior art.

For another example, the high layer signaling may be a Media Access Control (MAC) Control Element (CE) message and, specifically, the fifth indication information may be carried by adding a new MAC CE message.

For another example, specifically, the fifth indication information may be carried by using a vacant bit in an existing Master Information Block (MIB) or a System Information Block (SIB) of the system broadcast message, alternatively, the fifth indication information may be carried by adding a new SIB.

It will be appreciated that the high layer signaling or the system broadcast message involved in the following embodiments may be comprehended using the above way.

Further, in an embodiment, the network device may further transmit the fifth indication information to the terminal without using the high layer signaling or the system broadcast message, but preconfigure at least one of a location, a size, and a sequence of the frequency domain resource scheduling unit. In this way, the terminal may obtain the at least one of the location, the size, and the sequence of the frequency domain resource scheduling unit according to the pre-configuration, such as a protocol reservation.

For example, the fifth indication information is used to indicate the location of the frequency domain resource scheduling unit, then the size and the sequence of the frequency domain resource scheduling unit may be pre-defined in the protocol. In this way, it can be determined, according to the fifth indication information and the protocol definition, which frequency domain resource scheduling units are contained in the first frequency domain resource.

Alternatively, for another example, the fifth indication information is used to indicate the location and the size of the frequency domain resource scheduling unit, then the sequence of the frequency domain resource scheduling unit may be predefined in the protocol. In this way, it can be determined, according to the fifth indication information and the protocol definition, which frequency domain resource scheduling units are contained in the first frequency domain resource.

Alternatively, for another example, the fifth indication information is used to indicate the location and the sequence of the frequency domain resource scheduling unit, then the size of the frequency domain resource scheduling unit may be predefined in the protocol. In this way, it can be determined, according to the fifth indication information and the protocol definition, which frequency domain resource scheduling units are contained in the first frequency domain resource.

Alternatively, for another example, the fifth indication information is used to indicate the size and the sequence of the frequency domain resource scheduling unit, then the location of the frequency domain resource scheduling unit may be predefined in the protocol. In this way, it can be determined, according to the fifth indication information and the protocol definition, which frequency domain resource scheduling units are contained in the first frequency domain resource.

Alternatively, for another example, the fifth indication information is used to indicate the location, the size, and the sequence of the frequency domain resource scheduling unit. In this way, it can be determined, according to the fifth indication information, which frequency domain resource scheduling units are contained in the first frequency domain resource.

In a possible implementation of this embodiment, the time domain resource scheduling unit may include, but is not limited to a symbol or a mini-slot, which is not particularly limited in this embodiment. In this way, a latency requirement from the URLLC application scenario can be met.

In a possible implementation of this embodiment, before 202, it is also possible to further receive second indication information through high layer signaling or a system broadcast message, where the second indication information is used to indicate at least one of a location and a size of the second frequency domain resource.

It will be appreciated that the location and the size of the second frequency domain resource refer to a location and a size of a frequency domain resource scheduling unit contained in the second frequency domain resource to determine which frequency domain resource scheduling units are contained in the second frequency domain resource.

In particular, the terminal may specifically receive second indication information transmitted by the network device through high layer signaling or a system broadcast message.

Further, in an embodiment, the network device may further transmit the second indication information to the terminal without using the high layer signaling or the system broadcast message, but preconfigure at least one of a location and a size of the second frequency domain resource. In this way, the terminal may obtain the at least one of the location and the size of the second frequency domain resource according to the pre-configuration, such as a protocol reservation.

For example, the second indication information is used to indicate the location of the second frequency domain resource, then the size of the second frequency domain resource may be predefined in the protocol. In this way, it can be determined, according to the second indication information and the protocol definition, which frequency domain resource scheduling units are contained in the second frequency domain resource.

Alternatively, for another example, the second indication information is used to indicate the size of the second frequency domain resource, then the location of the second frequency domain resource may be predefined in the protocol. In this way, it can be determined, according to the second indication information and the protocol definition, which frequency domain resource scheduling units are contained in the second frequency domain resource.

Alternatively, for another example, the second indication information is used to indicate the location and the size of the second frequency domain resource. In this way, it can be determined, according to the second indication information, which frequency domain resource scheduling units are contained in the second frequency domain resource.

In this way, at least one of a location and a size of the first frequency domain resource may be then determined according to the first indication information, at least one of a location, a size and a sequence of a frequency domain resource scheduling unit contained in the first frequency domain resource, and the at least one of the location and the size of the second frequency domain resource.

Alternatively, at least one of a location and a size of the first frequency domain resource may be further determined according to the first indication information, at least one of a location, a size and a sequence of a frequency domain resource scheduling unit contained in the first frequency domain resource, and at least one of a location and a size of a pre-configured reference frequency domain resource.

In particular, the terminal may specifically receive sixth indication information transmitted by the network device through high layer signaling or a system broadcast message, where the sixth indication information is used to indicate the at least one of the location and the size of the reference frequency domain resource to determine which frequency domain resource scheduling units are contained in the reference frequency domain resource.

It will be appreciated that the location and the size of the reference frequency domain resource refer to a location and a size of a frequency domain resource scheduling unit contained in the reference frequency domain resource.

Further, in an embodiment, the network device may further transmit the sixth indication information to the terminal without using the high layer signaling or the system broadcast message, but preconfigure at least one of a location and a size of the reference frequency domain resource. In this way, the terminal may then obtain the at least one of the location and the size of the reference frequency domain resource according to the pre-configuration, such as a protocol reservation.

In a possible implementation of this embodiment, it is also possible to further receive third indication information that is used for indicating a third frequency domain resource in a downlink control channel transmitted by the first frequency domain resource or the second frequency domain resource, where the third frequency domain resource contains the first frequency domain resource and the frequency domain resource for transmitting the downlink data channel within the at least one time domain resource scheduling unit.

In this way, the terminal may then obtain, according to the third frequency domain resource and the first frequency domain resource, the frequency domain resource for transmitting the downlink data channel within the at least one time domain resource scheduling unit. For example, a difference between the third frequency domain resource and the first frequency domain resource is used as the frequency domain resource for transmitting the downlink data channel within the at least one time domain resource scheduling unit.

The downlink data channel may be specifically a Physical Downlink Shared Channel (PDSCH).

It will be appreciated that a location and a size of the third frequency domain resource refer to a location and a size of a frequency domain resource scheduling unit contained in the third frequency domain resource to determine which frequency domain resource scheduling units are contained in the third frequency domain resource.

In a possible implementation of this embodiment, it is also possible to further receive fourth indication information through high layer signaling or a system broadcast message, where the fourth indication information is used to indicate at least one of a location and a size of the fourth frequency domain resource.

The fourth frequency domain resource is a default value of the first frequency domain resource. When the terminal has not received the first indication information transmitted by the network device, it determines the fourth frequency domain resource as the first frequency domain resource; when the terminal receives the first indication information transmitted by the network device, it determines the first frequency domain resource according to the first indication information.

It will be appreciated that a location and a size of the fourth frequency domain resource refer to a location and a size of a frequency domain resource scheduling unit contained in the fourth frequency domain resource.

In particular, the terminal may specifically receive fourth indication information transmitted by the network device through high layer signaling or a system broadcast message.

Further, in an embodiment, the network device may further transmit the fourth indication information to the terminal without using the high layer signaling or the system broadcast message, but preconfigure at least one of a location and a size of the fourth frequency domain resource. In this way, the terminal may obtain the at least one of the location and the size of the fourth frequency domain resource according to the pre-configuration, such as a protocol reservation.

In order to describe the method provided by the embodiment of the present disclosure more clearly, similarly, reference may also be made to relevant contents in the embodiments corresponding to FIG. 1A~FIG. 1H, for which details will not be described herein again.

In this embodiment, a frequency domain resource for transmitting a downlink control channel can be dynamically configured within each time domain resource scheduling unit and thereby the purpose of adapting to a change in different number of users is achieved by means that receiving, in a downlink control channel transmitted by a pre-configured second frequency domain resource, first indication information that is used for indicating the number of frequency domain resource scheduling units contained in a first frequency domain resource and thereby determining, according to the first indication information, the number of frequency domain resource scheduling units contained in the first frequency domain resource, where the first frequency domain resource is a frequency domain resource for transmitting a downlink control channel within at least one time domain resource scheduling unit.

In addition, with the technical solutions provided by the present disclosure, since a mode in which a downlink control channel and a downlink data channel fully share a frequency domain resource is used, utilization of a spectrum resource can be further improved while a latency requirement from the URLLC application scenario is ensured.

In addition, compared to indication of a frequency domain resource for transmitting a downlink control channel with a bitmap mode, according to the technical solutions provided by the present disclosure, signaling overhead can be effectively saved, meanwhile complexity of a terminal can also be reduced and a speed at which the terminal detects a downlink data channel is expedited, and it is ensured that the downlink control channel of each terminal is transmitted instantly, thereby effectively shortening the latency of the URLLC application scenario.

It should be noted that, with regard to the foregoing method embodiments, for the sake of simple description, they are all expressed as a series of action combinations; however, those skilled in the art should understand that the present disclosure is not limited to the described action sequences. Because certain steps may be performed in a further sequence or concurrently in accordance with the present disclosure. In addition, those skilled in the art should also understand that the embodiments described in the specification are all preferred embodiments, and the actions and modules involved therein are not necessary to the present disclosure.

In the above embodiments, each embodiment is described with a different emphasis; for the part not elaborated in an embodiment, reference may be made to related description in other embodiments.

Figure 3:
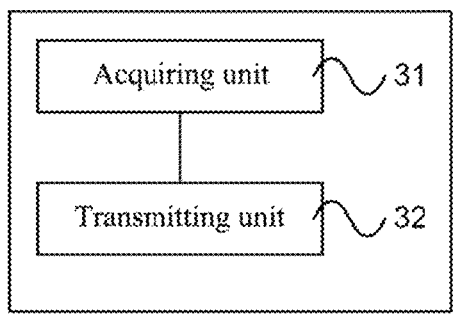
FIG. 3 is a schematic structural diagram of a network device provided by another embodiment of the present disclosure.

FIG. 3 is a schematic structural diagram of a network device provided by another embodiment of the present disclosure, as shown by FIG. 3. The network device in this embodiment may include an acquiring unit 31 and a transmitting unit 32. The acquiring unit 31 is configured to acquire first indication information that is used for indicating a number of frequency domain resource scheduling units contained in a first frequency domain resource, where the first frequency domain resource is a frequency domain resource for transmitting a downlink control channel within at least one time domain resource scheduling unit; and the transmitting unit 32 is configured to transmit the first indication information in a downlink control channel transmitted by a pre-configured second frequency domain resource.

The downlink control channel may be specifically a Physical Downlink Control Channel (PDCCH).

In a possible implementation of this embodiment, the frequency domain resource scheduling unit may include but is not limited to an RB, an REG, a Resource Block Group (RBG), or a CCE, which is not particularly limited in this embodiment.

Specifically, distribution mode of the frequency domain resource scheduling unit may include, but is not limited to a continuous distribution mode or a discontinuous distribution mode, which is not particularly limited in this embodiment.

In a possible implementation of this embodiment, the transmitting unit 32 may also be further configured to: preconfigure at least one of a location, a size, and a sequence of the frequency domain resource scheduling unit; or transmit fifth indication information through high layer signaling or a system broadcast message, where the fifth indication information is used to indicate at least one of a location, a size, and a sequence of the frequency domain resource scheduling unit.

In a possible implementation of this embodiment, the time domain resource scheduling unit may include, but is not limited to a symbol or a mini-slot, which is not particularly limited in this embodiment. In this way, a latency requirement from the URLLC application scenario can be met.

In a possible implementation of this embodiment, the transmitting unit 32 may also be further configured to: preconfigure at least one of a location and a size of the second frequency domain resource; or transmit second indication information through high layer signaling or a system broadcast message, where the second indication information is used to indicate at least one of a location and a size of the second frequency domain resource.

It will be appreciated that the location and the size of the second frequency domain resource refer to a location and a size of a frequency domain resource scheduling unit contained in the second frequency domain resource to determine which frequency domain resource scheduling units are contained in the second frequency domain resource.

In this way, at least one of a location and a size of the first frequency domain resource may be then determined according to the first indication information, at least one of a location, a size and a sequence of a frequency domain resource scheduling unit contained in the first frequency domain resource, and the at least one of the location and the size of the second frequency domain resource.

Alternatively, at least one of a location and a size of the first frequency domain resource may be further determined according to the first indication information, at least one of a location, a size and a sequence of a frequency domain resource scheduling unit contained in the first frequency domain resource, and at least one of a location and a size of a pre-configured reference frequency domain resource.

In particular, the transmitting unit 32 may also be further configured to: preconfigure the at least one of the location and the size of the reference frequency domain resource; or transmit sixth indication information through high layer signaling or a system broadcast message, where the sixth indication information is used to indicate the at least one of the location and the size of the reference frequency domain resource.

It will be appreciated that the location and the size of the reference frequency domain resource refer to a location and a size of a frequency domain resource scheduling unit contained in the reference frequency domain resource.

In a possible implementation of this embodiment, the transmitting unit 32 may also be further configured to: transmit third indication information that is used for indicating a third frequency domain resource in a downlink control channel transmitted by the first frequency domain resource or the second frequency domain resource, where the third frequency domain resource contains the first frequency domain resource and the frequency domain resource for transmitting the downlink data channel within the at least one time domain resource scheduling unit.

The downlink data channel may be specifically a Physical Downlink Shared Channel (PDSCH).

It will be appreciated that a location and a size of the third frequency domain resource refer to a location and a size of a frequency domain resource scheduling unit contained in the third frequency domain resource to determine which frequency domain resource scheduling units are contained in the third frequency domain resource.

In a possible implementation of this embodiment, the transmitting unit 32 may also be further configured to: preconfigure at least one of a location and a size of a fourth frequency domain resource, where the fourth frequency domain resource is a default value of the first frequency domain resource; or transmit fourth indication information through high layer signaling or a system broadcast message, where the fourth indication information is used to indicate at least one of a location and a size of the fourth frequency domain resource.

It should be noted that the method in the embodiments corresponding to FIG. 1A~FIG. 1H may be implemented by the network device provided in this embodiment. Reference may be made to relevant contents in the embodiments corresponding to FIG. 1A~FIG. 1H for detailed description which will not be described herein again.

In this embodiment, a frequency domain resource for transmitting a downlink control channel can be dynamically configured within each time domain resource scheduling unit and thereby the purpose of adapting to a change in different number of users is achieved by means that an acquiring unit to acquire first indication information that is used for indicating the number of frequency domain resource scheduling units contained in a first frequency domain resource and thereby a transmitting unit to transmit the first indication information in a downlink control channel transmitted by a pre-configured second frequency domain resource, where the first frequency domain resource is a frequency domain resource for transmitting a downlink control channel within at least one time domain resource scheduling unit.

In addition, with the technical solutions provided by the present disclosure, since a mode in which a downlink control channel and a downlink data channel fully share a frequency domain resource is used, utilization of a spectrum resource can be further improved while a latency requirement from the URLLC application scenario is ensured.

In addition, compared to indication of a frequency domain resource for transmitting a downlink control channel with a bitmap mode, according to the technical solutions provided by the present disclosure, signaling overhead can be effectively saved, meanwhile complexity of a terminal can also be reduced and a speed at which the terminal detects a downlink data channel is expedited, and it is ensured that the downlink control channel of each terminal is transmitted instantly, thereby effectively shortening the latency of the URLLC application scenario.

Figure 4:
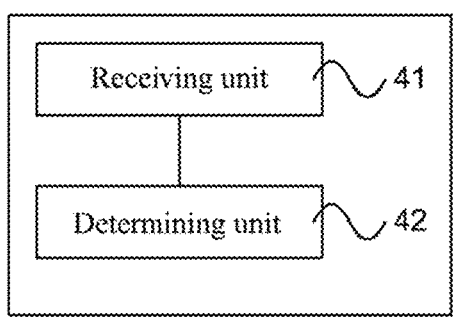
FIG. 4 is a schematic structural diagram of a terminal provided by another embodiment of the present disclosure.

FIG. 4 is a schematic structural diagram of a terminal provided by another embodiment of the present disclosure, as shown by FIG. 4. The terminal device in this embodiment may include a receiving unit 41 and a determining unit 42. The receiving unit 41 is configured to receive, in a downlink control channel transmitted by a pre-configured second frequency domain resource, first indication information that is used for indicating a number of frequency domain resource scheduling units contained in a first frequency domain resource, where the first frequency domain resource is a frequency domain resource for transmitting a downlink control channel within at least one time domain resource scheduling unit; and the determining unit 42 is configured to determine, according to the first indication information, the number of frequency domain resource scheduling units contained in the first frequency domain resource.

The downlink control channel may be specifically a Physical Downlink Control Channel (PDCCH).

In a possible implementation of this embodiment, the frequency domain resource scheduling unit may include but is not limited to an RB, an REG, a Resource Block Group (RBG), or a CCE, which is not particularly limited in this embodiment.

Specifically, distribution mode of the frequency domain resource scheduling unit may include, but is not limited to a continuous distribution mode or a discontinuous distribution mode, which is not particularly limited in this embodiment.

In a possible implementation of this embodiment, the receiving unit 41 may also be further configured to: preconfigure at least one of a location, a size, and a sequence of the frequency domain resource scheduling unit; or receive fifth indication information through high layer signaling or a system broadcast message, where the fifth indication information is used to indicate at least one of a location, a size, and a sequence of the frequency domain resource scheduling unit.

In a possible implementation of this embodiment, the time domain resource scheduling unit may include, but is not limited to a symbol or a mini-slot, which is not particularly limited in this embodiment. In this way, a latency requirement from the URLLC application scenario can be met.

In a possible implementation of this embodiment, the receiving unit 41 may also be further configured to: preconfigure at least one of a location and a size of the second frequency domain resource; or receive second indication information through high layer signaling or a system broadcast message, where the second indication information is used to indicate at least one of a location and a size of the second frequency domain resource.

It will be appreciated that the location and the size of the second frequency domain resource refer to a location and a size of a frequency domain resource scheduling unit contained in the second frequency domain resource to determine which frequency domain resource scheduling units are contained in the second frequency domain resource.

In this way, at least one of a location and a size of the first frequency domain resource may be then determined according to the first indication information, at least one of a location, a size and a sequence of a frequency domain resource scheduling unit contained in the first frequency domain resource, and the at least one of the location and the size of the second frequency domain resource.

Alternatively, at least one of a location and a size of the first frequency domain resource may be further determined according to the first indication information, at least one of a location, a size and a sequence of a frequency domain resource scheduling unit contained in the first frequency domain resource, and at least one of a location and a size of a pre-configured reference frequency domain resource.

In particular, the receiving unit 41 may also be further configured to: preconfigure the at least one of the location and the size of the reference frequency domain resource; or receive sixth indication information through high layer signaling or a system broadcast message, where the sixth indication information is used to indicate the at least one of the location and the size of the reference frequency domain resource.

It will be appreciated that the location and the size of the reference frequency domain resource refer to a location and a size of a frequency domain resource scheduling unit contained in the reference frequency domain resource.

In a possible implementation of this embodiment, the receiving unit 41 may also be further configured to: receive third indication information that is used for indicating a third frequency domain resource in a downlink control channel transmitted by the first frequency domain resource or the second frequency domain resource, where the third frequency domain resource contains the first frequency domain resource and the frequency domain resource for transmitting the downlink data channel within the at least one time domain resource scheduling unit.

In this way, the terminal may then obtain, according to the third frequency domain resource and the first frequency domain resource, the frequency domain resource for transmitting the downlink data channel within the at least one time domain resource scheduling unit. For example, a difference between the third frequency domain resource and the first frequency domain resource is used as the frequency domain resource for transmitting the downlink data channel within the at least one time domain resource scheduling unit.

The downlink data channel may be specifically a Physical Downlink Shared Channel (PDSCH).

It will be appreciated that a location and a size of the third frequency domain resource refer to a location and a size of a frequency domain resource scheduling unit contained in the third frequency domain resource to determine which frequency domain resource scheduling units are contained in the third frequency domain resource.

In a possible implementation of this embodiment, the receiving unit 41 may also be further configured to: preconfigure at least one of a location and a size of a fourth frequency domain resource, where the fourth frequency domain resource is a default value of the first frequency domain resource; or receive fourth indication information through high layer signaling or a system broadcast message, where the fourth indication information is used to indicate at least one of a location and a size of the fourth frequency domain resource.

The fourth frequency domain resource is a default value of the first frequency domain resource. When the terminal has not received the first indication information transmitted by the network device, it determines the fourth frequency domain resource as the first frequency domain resource; when the terminal receives the first indication information transmitted by the network device, it determines the first frequency domain resource according to the first indication information.

It will be appreciated that a location and a size of the fourth frequency domain resource refer to a location and a size of a frequency domain resource scheduling unit contained in the fourth frequency domain resource.

It should be noted that the method in the embodiment corresponding to FIG. 2 may be implemented by the terminal provided in this embodiment. Reference may be made to relevant contents in the embodiment corresponding to FIG. 2 for detailed description which will not be described herein again.

In this embodiment, a frequency domain resource for transmitting a downlink control channel can be dynamically configured within each time domain resource scheduling unit and thereby the purpose of adapting to a change in different number of users is achieved by means that a receiving unit to receive, in a downlink control channel transmitted by a pre-configured second frequency domain resource, first indication information that is used for indicating the number of frequency domain resource scheduling units contained in a first frequency domain resource and thereby a determining unit to determine, according to the first indication information, the number of frequency domain resource scheduling units contained in the first frequency domain resource, where the first frequency domain resource is a frequency domain resource for transmitting a downlink control channel within at least one time domain resource scheduling unit.

In addition, with the technical solutions provided by the present disclosure, since a mode in which a downlink control channel and a downlink data channel fully share a frequency domain resource is used, utilization of a spectrum resource can be further improved while a latency requirement from the URLLC application scenario is ensured.

In addition, compared to indication of a frequency domain resource for transmitting a downlink control channel with a bitmap mode, according to the technical solutions provided by the present disclosure, signaling overhead can be effectively saved, meanwhile complexity of a terminal can also be reduced and a speed at which the terminal detects a downlink data channel is expedited, and it is ensured that the downlink control channel of each terminal is transmitted instantly, thereby effectively shortening the latency of the URLLC application scenario.

It may be clearly understood by persons skilled in the art that, for the purpose of convenient and brief description, reference may be to the corresponding process in the foregoing method embodiments for a detailed working process of the foregoing system, apparatus, and unit, and the details will not described herein again.

In several embodiments provided by the present disclosure, it should be understood that the disclosed system, apparatus, and method may be implemented in other manners. For example, the described apparatus embodiments are merely exemplary. For example, the division of units is merely a logical function division and there may be other divisions in actual implementation. For example, multiple units or components may be combined or integrated into another system, or some features may be ignored or not performed. In addition, the mutual couplings or direct couplings or communication connections shown or discussed herein may be implemented through some interfaces. The indirect couplings or communication connections between apparatuses or units may be implemented in electronic, mechanical, or other forms.

The units described as separate parts may or may not be physically separate, and parts shown as units may or may not be physical units, that is, they may be located in one position, or may be distributed on multiple network units. A part or all of the units may be selected according to actual needs to achieve the objectives of the solutions of the embodiments.

In addition, each of functional units in each of embodiments of the present disclosure may be integrated into one processing unit, or each of the units may exist alone physically, or two or more units are integrated into one unit. The integrated unit may be implemented in a form of hardware, or may be implemented in a form of a hardware plus software functional unit.

Finally, it should be noted that the foregoing embodiments are merely intended for describing the technical solutions of the present disclosure other than limiting the present disclosure. Although the present disclosure is described in detail with reference to the foregoing embodiments, persons of ordinary skill in the art should understand that they may still make modifications to the technical solutions described in the foregoing embodiments, or make equivalent replacements to some technical features therein; however, these modifications or replacements do not make the essence of corresponding technical solutions depart from the spirit and scope of the technical solutions in each of the embodiments of the present disclosure.

What is claimed is:

1. A downlink control channel configuration method, comprising:
   receiving, in a downlink control channel transmitted by a pre-configured second frequency domain resource, first indication information that is used for indicating a number of frequency domain resource scheduling units contained in a first frequency domain resource, wherein the first frequency domain resource is a frequency domain resource for transmitting a downlink control channel within at least one time domain resource scheduling unit;
   determining, according to the first indication information, the number of frequency domain resource scheduling units contained in the first frequency domain resource;
   preconfiguring a location and a size of a fourth frequency domain resource; wherein the fourth frequency domain resource is a default value of the first frequency domain resource; or receiving fourth indication information through high layer signaling or a system broadcast message, wherein the fourth indication information is used to indicate a location and a size of the fourth frequency domain resource, wherein when the the first indication information has not been received, the fourth frequency domain resource is determined as the first frequency domain resource;
   preconfiguring a location, a size, and a sequence of the frequency domain resource scheduling unit or receiving fifth indication information through high layer signaling or a system broadcast message, wherein the fifth indication information is used to indicate a location, a size, and a sequence of the frequency domain resource scheduling unit; and
   receiving third indication information that is used for indicating a third frequency domain resource in a downlink control channel transmitted by the first frequency domain resource, wherein the third frequency domain resource contains the first frequency domain resource and the frequency domain resource for transmitting the downlink data channel within the at least one time domain resource scheduling unit, wherein a difference between the third frequency domain resource and the first frequency domain resource is used as the frequency domain resource for transmitting the downlink data channel within the at least one time domain resource scheduling unit.

2. The method according to claim 1, wherein the frequency domain resource scheduling unit comprises a resource block (RB), a resource element group (REG), a resource block group (RBG), or a control channel element (CCE).

3. The method according to claim 1, wherein a distribution mode of the frequency domain resource scheduling unit comprises a continuous distribution mode or a discontinuous distribution mode.

4. The method according to claim 1, wherein the time domain resource scheduling unit comprises a symbol or a mini-slot.

5. The method according to claim 1, before the receiving, in a downlink control channel transmitted by a pre-configured second frequency domain resource, first indication information, further comprising:
preconfiguring at least one of a location and a size of the second frequency domain resource; or
receiving second indication information through high layer signaling or a system broadcast message, wherein the second indication information is used to indicate at least one of a location and a size of the second frequency domain resource.

6. The method according to claim 5, wherein at least one of a location and a size of the first frequency domain resource is determined according to the first indication information and the at least one of the location and the size of the second frequency domain resource.

7. The method according to claim 1, wherein at least one of a location and a size of the first frequency domain resource is determined according to the first indication information and at least one of a location and a size of a pre-configured reference frequency domain resource.

8. The method according to claim 7, further comprising:
preconfiguring the at least one of the location and the size of the reference frequency domain resource; or
receiving sixth indication information through high layer signaling or a system broadcast message, wherein the sixth indication information is used to indicate the at least one of the location and the size of the reference frequency domain resource.

9. A terminal, comprising a processor and a receiver, wherein
the receiver is configure to receive, in a downlink control channel transmitted by a pre-configured second frequency domain resource, first indication information that is used for indicating a number of frequency domain resource scheduling units contained in a first frequency domain resource, wherein the first frequency domain resource is a frequency domain resource for transmitting a downlink control channel within at least one time domain resource scheduling unit;
the processor is configure to determine, according to the first indication information, the number of frequency domain resource scheduling units contained in the first frequency domain resource;
the processor is further configured to preconfigure a location and a size of a fourth frequency domain resource; wherein the fourth frequency domain resource is a default value of the first frequency domain resource; or the receiver is further configure to receive fourth indication information through high layer signaling or a system broadcast message, wherein the fourth indication information is used to indicate a location and a size of the fourth frequency domain resource; wherein when the the first indication information has not been received, the fourth frequency domain resource is determined as the first frequency domain resource;
the processor is further configured to preconfigure a location, a size, and a sequence of the frequency domain resource scheduling unit or the receiver is further configured to receive fifth indication information through high layer signaling or a system broadcast message, wherein the fifth indication information is used to indicate a location, a size, and a sequence of the frequency domain resource scheduling unit; and
the receiver is further configured to receive third indication information that is used for indicating a third frequency domain resource in a downlink control channel transmitted by the first frequency domain resource, wherein the third frequency domain resource contains the first frequency domain resource and the frequency domain resource for transmitting the downlink data channel within the at least one time domain resource scheduling unit, wherein a difference between the third frequency domain resource and the first frequency domain resource is used as the frequency domain resource for transmitting the downlink data channel within the at least one time domain resource scheduling unit.

10. The terminal according to claim 9, wherein the frequency domain resource scheduling unit comprises a resource block (RB), a resource element group (REG), a resource block group (RBG), or a control channel element (CCE).

11. The terminal according to claim 9, wherein a distribution mode of the frequency domain resource scheduling unit comprises a continuous distribution mode or a discontinuous distribution mode.

12. The terminal according to claim 9, wherein the time domain resource scheduling unit comprises a symbol or a mini-slot.

13. The terminal according to claim 9, the processor is further configured to:
preconfigure at least one of a location and a size of the second frequency domain resource; or
the receiver is further configured to receive second indication information through high layer signaling or a system broadcast message, wherein the second indication information is used to indicate at least one of a location and a size of the second frequency domain resource.

14. The terminal according to claim 13, wherein at least one of a location and a size of the first frequency domain resource is determined according to the first indication information and the at least one of the location and the size of the second frequency domain resource.

15. The terminal according to claim 9, wherein at least one of a location and a size of the first frequency domain resource is determined according to the first indication information and at least one of a location and a size of a pre-configured reference frequency domain resource.

16. The terminal according to claim 15, the processor is further configured to:
preconfigure the at least one of the location and the size of the reference frequency domain resource; or
the receiver is further configured to receive sixth indication information through high layer signaling or a system broadcast message, wherein the sixth indication information is used to indicate the at least one of the location and the size of the reference frequency domain resource.

* * * * *